United States Patent [19]

McLaughlin

[11] 4,171,737
[45] Oct. 23, 1979

[54] ENTRY CONTROL DEVICE

[75] Inventor: Richard S. McLaughlin, Dallas, Tex.

[73] Assignee: Docutel Corporation, Irving, Tex.

[21] Appl. No.: 838,727

[22] Filed: Oct. 3, 1977

[51] Int. Cl.² ............................................. G07F 1/06
[52] U.S. Cl. .................................................. 194/4 R
[58] Field of Search ................... 49/68, 103, 108, 114, 49/122; 194/4 C, 4 R; 232/19, 21

[56] References Cited

U.S. PATENT DOCUMENTS

| 1,527,223 | 2/1925 | Rastetter | 232/19 |
| 1,824,881 | 9/1931 | Foss | 232/19 X |
| 3,766,687 | 10/1973 | Henson | 49/3.5 |
| 3,815,719 | 6/1974 | Streeter et al. | 194/4 G |
| 3,980,167 | 9/1976 | Tamura et al. | 194/4 R |
| 3,995,728 | 12/1976 | Kerby | 194/4 D |

Primary Examiner—Stanley H. Tollberg
Attorney, Agent, or Firm—Richards, Harris & Medlock

[57] ABSTRACT

An entry control device is provided for controlling the entry of a preselected document, such as a coded credit card into a dispensing machine wherein various checking and dispensing functions are performed as a result of the information obtained from the coded card. The control device includes a housing having an entry passage therein for receiving and orienting the preselected document for transport into the dispensing system. A gate is pivotally mounted to the housing for pivotal movement between a closed position for barring entry of the document into the dispensing system and is rotatable to an open position by insertion of the document into the entry passage of the housing. A trigger is pivotally mounted to the housing for movement between first and second positions. The trigger extends into the entry passage and is disposed adjacent the gate. The device further includes a locking lever pivotally mounted to the housing and the trigger for movement between a locked position and an unlocked position corresponding to the trigger first and second positions. Engagement of the document with the trigger rotates the locking lever from the locked position to the unlocked position to cause the trigger to rotate from the first position to the second position, thereby causing rotation of the gate from the closed position to the open position to allow entry of the document into the dispensing system. Disengagement of the document with the trigger causes rotation of the gate from the open position to the closed position.

24 Claims, 10 Drawing Figures

ENTRY CONTROL DEVICE

FIELD OF THE INVENTION

This invention relates to an entry control device, and more particularly to an entry control device for controlling the entry of preselected documents into a dispensing system.

THE PRIOR ART

Presently, coded credit cards are being utilized to actuate automatic dispensing systems of various kinds and configurations. These dispensing systems are used for dispensing, for example, currency, gasoline and food in response to insertion of a properly coded credit card. These dispensing systems operate by a user inserting his credit card into an entry passage that receives and orients the card for transport into the dispensing system. Usually the transport portion of the dispensing system is part of a code reading mechanism that functions to scan the card for coded data. Various types of code readers are available including optical recognition, magnetic recognition and punched hole recognition. The entire dispensing system can be rendered inoperative due to insertion of improperly sized credit cards or debris into the entry gate.

Prior art entry controlled devices have been proposed to prevent the insertion of foreign material into the dispensing system. These devices include those described and claimed in U.s. Pat. No. 3,766,687 to Henson, issued Oct. 23, 1973 and entitled "Apparatus for Entry Control" and U.S. Pat. No. 3,980,167 to Tamura et al, issued Sept. 14, 1976 and entitled "Entry Control Device". However, these devices require a multiplicity of components, including springs, which contribute to high cost and unstable operation of these entry control devices A need has thus arisen for an entry control device for preselected documents such as coded credit cards to be incorporated in a dispensing machine for controlling the entry of documents into the dispensing machine which is simple in construction, resulting in low manufacturing costs with insured reliability. Furthermore, a need has arisen for an entry control device for preventing the return from the dispensing system of properly sized coded credit cards when the code readers determine that the card is expired or has been reported lost by the credit card owner.

SUMMARY OF THE INVENTION

In accordance with the present invention, a control device for controlling the entry of a preselected document into a dispensing system includes a housing having an entry passage therein for receiving and orienting the preselected document for transport into the dispensing system. A gate is pivotally mounted to the housing for pivotal movement between a closed position for barring entry of a document into the dispensing system and is rotatable to an open position by insertion of the document into the entry passage of the housing. A trigger is pivotally mounted to the housing for movement between first and second positions. The trigger extends into the entry passage and is disposed adjacent the gate. The device further includes a locking lever pivotally mounted to the housing and the trigger for movement between a locked position and an unlocked position corresponding to the trigger first and second positions. The engagement of the document with the trigger rotates the locking lever from the locked position to the unlocked position to cause the trigger to rotate from the first position to the second position. Rotation of the trigger causes rotation of the gate from the closed position to the open position. Disengagement of the document with the trigger causes rotation of the gate from the open position to the closed position.

In accordance with another aspect of the present invention, a control device for controlling the entry of a preselected document into a dispensing system includes a housing having an entry passage therein for receiving and orienting the preselected document for transport into the dispensing system. A gate is pivotally mounted to the housing for pivotal movement between a closed position for barring entry of the document into the dispensing system and rotatable to an open position by insertion of the document into the entry passage of the housing. The device includes first and second triggers pivotally mounted to the housing for movement between first and second positions. The triggers extend into the entry passage and are disposed adjacent the sides of the gate and the sides of the entry passage. A first locking lever is pivotally mounted to the housing and the first trigger for movement between a locked position and an unlocked position corresponding to the first trigger first and second positions. A second locking lever is pivotally mounted to the housing and the second trigger for movement between a locked position and an unlocked position corresponding to the second trigger first and second positions. The triggers when simultaneously engaged by the document are caused to rotate the first and second locking levers from the locked position to the unlocked position to cause the triggers to rotate from the first position to the second position. This rotation causes rotation of the gate from the closed position to the open position. Disengagement of the document from the first and second triggers causes rotation of the gate from the open position to the closed position. The device further includes apparatus attached to the first and second locking levers for preventing removal of the document from the entry passage.

In accordance with yet another aspect of the present invention, a control device for controlling the entry of a preselected document into a dispensing system includes a housing having an entry passage therein for receiving and orienting the preselected document for transport into the dispensing system. A gate is pivotally mounted to the housing for pivotal movement between a closed position for barring entry of a document into the dispensing system and is rotatable to an open position when a document is inserted into the entry passage of the housing.The device further includes an actuating lever pivotally mounted to the gate and disposed adjacent the entry passage for pivotal movement between first and second positions when engaged by the document to thereby rotate the gate to the open position.

DESCRIPTION OF THE DRAWINGS

A more complete understanding of the invention and its advantages may best be understood by reference to the following description taken in conjunction with the accompanying drawings in which.

DESCRIPTION OF THE PREFERRED EMBODIMENT

Figure 1:
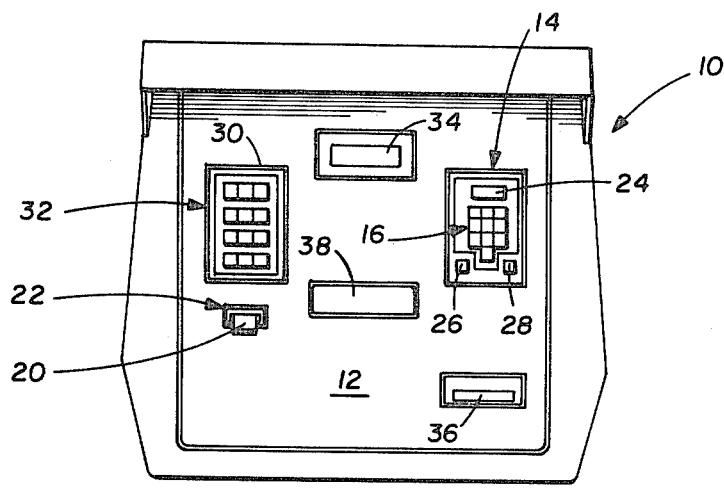
FIG. 1 is a side elevational view of a currency dispensing system showing an application of the entry control device of the present invention.

Referring to FIG. 1, there is shown a currency dispenser system including a console unit 10 wherein document entry control is employed. Console unit 10 houses mechanical operating sections of the system, and in addition contains customer interface equipment mounted to a front panel 12. Front panel 12 of the console unit 10 includes a keyboard generally identified by the numeral 14 including an array of ten push button keys 16 for use by a customer to interface with the currency dispenser system. Push button keys 16 are marked with numerals 0-9, to enable a user to input his assigned identification code for verification of his authority to use a coded credit card 20 presented to the currency dispenser system through an entry control device generally identified by the numeral 22.

Push button keys 16 are also utilized by the customer to enter the amount of the transaction, either a withdrawal or a deposit, to be conducted. This amount is displayed to the customer in a display window 24. Also contained on the keyboard 14 is a "clear" push button key 26 for correcting mistakes made by the user in inputting his assigned identification code. Keyboard 14 further includes an "enter" push button key 28 that is depressed after the user has input the amount of the transaction using push button keys 16.

Front panel 12 of the console unit 10 further includes a keyboard 30, including an array of push button keys 32. Push button keys 32 are used to select the type of transaction the customer wishes to conduct, such as deposit, payment, withdrawal, or transfer of funds from a checking account to a savings account. Front panel 12 further includes an instruction window display 34 that provides for viewing an illuminated display message drum. The messages on this drum instruct the user in the operation of the currency dispensing system. A depository opening 36 is also provided in the front panel 12 of console unit 10. The depository opening 36 permits the user to deposit into the console unit 10, such things as cash, checks, loan payments or savings passbooks. The final user interface on the front panel 12 of the console unit 10 is a cash drawer 38 that fits flush with the front panel 12 in a closed and locked position. Drawer 38 dispenses cash and receipts of the transaction conducted by the customer using the keyboards 14 and 30 in connection with the transaction.

Upon presentation of credit card 20 to the entry control device 22 of the console unit 10, credit card 20 is transported through a plurality of reading stations by a card reader (not shown) to activate various systems in a preordered sequence within the currency dispensing system. Typically, a currency dispensing system may be activated by a standard "A" size plastic coded credit card with a strip of magnetic material located on the back side and containing coded data read by a card reader. It is this coded data that activates the various systems in the preordered sequence. For a more complete understanding of the operation of a currency dispensing system, reference is made to U.S. Pat. No. 3,715,569 to John R. Hicks and William C. Bortzfield, issued Feb. 6, 1973, and entitled "Credit Card Automatic Currency Dispenser".

In a normal dispensing cycle, the coded credit card 20 is transported through a card reader in one direction during the first part of a sequence and then returned to the user through the entry control device 22 at a later step near the completion of a cycle. To prevent odd sized coded credit cards from being forced into the card reader and miscellaneous debris from being jammed into the currency dispenser system, the entry control device 22 is provided for the console unit 10.

Figure 2:
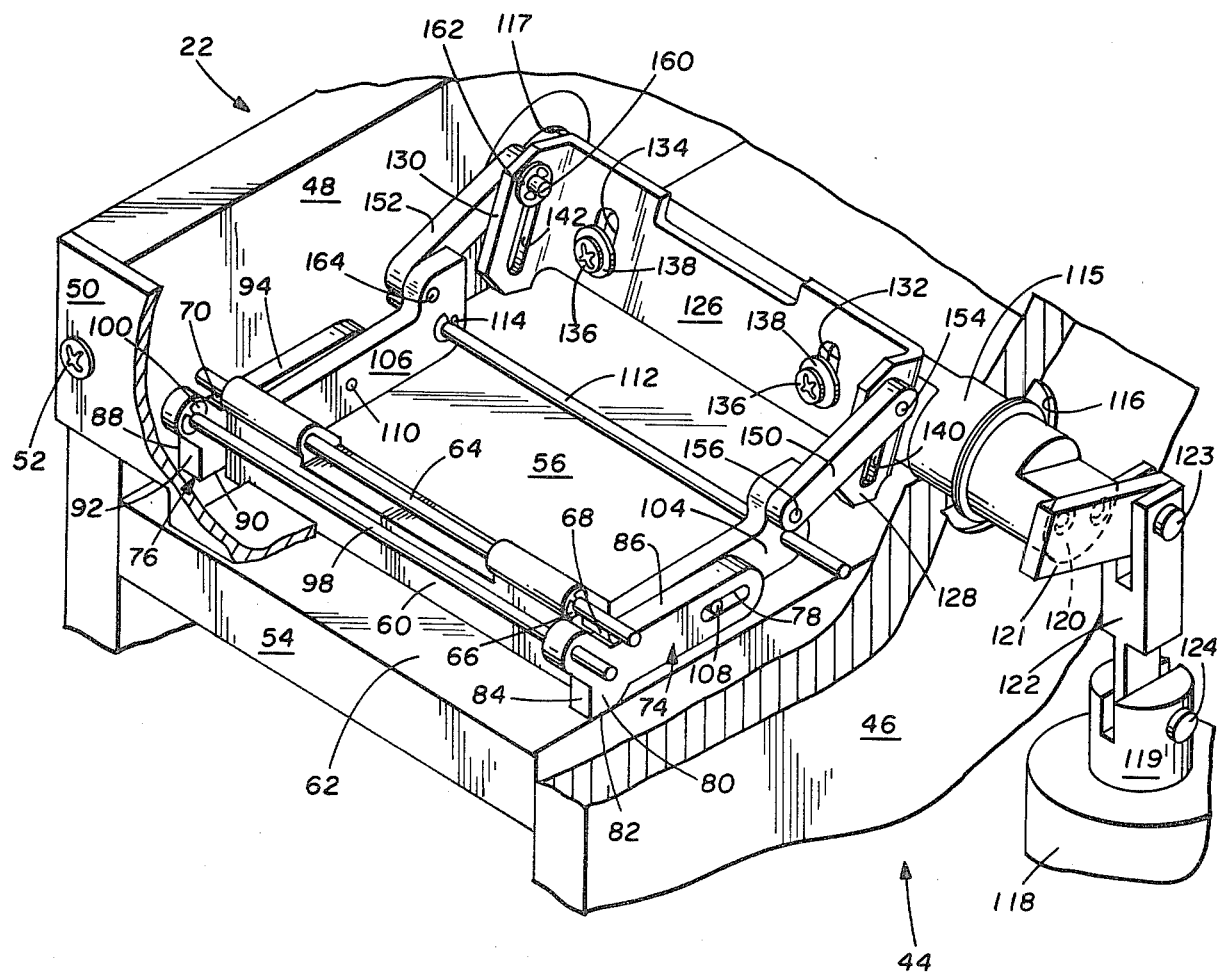
FIG. 2 is a perspective view of a first embodiment of the entry control device of the present invention.

Referring to FIG. 2, the entry control device 22 of the present invention is illustrated. The entry control device 22 includes a housing generally identified by the numeral 44. Housing 44 includes vertical side walls 46 and 48 and a front wall 50. Front wall 50 of housing 44 is secured to the side walls 48 and 46 using screws 52. Housing 44 further includes a base portion 54 including an upper base surface 56 positioned on a plane perpendicular to the side walls 46 and 48 of housing 44.

Entry of credit card 20 into the console unit 10 is controlled by an entry gate 60 within the entry control device 22. Entry gate 60 is positioned to extend across a card throat 62. Card throat 62 receives and orients the coded credit card 20 (FIG. 1) for transport into the entry control device 22. Entry gate 60 is pivotally mounted to side walls 46 and 48 of housing 44 using a mounting shaft 64. Mounting shaft 64 extends across the card throat 62 and is affixed to entry gate 60 using C-washers 66. Also affixed to the entry gate 60 are gate pins 68 and 70, the operation of which will be subsequently described.

Positioned adjacent the entry gate 60 and extending into the card throat 62 are trigger levers 74 and 76. Trigger lever 74 includes a slotted aperture 78 positioned towards the rear of the trigger lever 74. Positioned towards the front end of trigger lever 74 is a foot 80 having a bottom surface 82, shown engaging the upper base surface 56, and a front camming surface 84. Trigger lever 74 further includes a top camming surface 86 disposed below the gate pin 68. Similarly, trigger lever 76 includes a slotted aperture (not shown) and a forwardly disposed foot 88 having a bottom surface 90 and a front camming surface 92. Trigger lever 76 further includes a top camming surface 94 disposed below the gate pin 70.

Trigger levers 74 and 76 are pivotally mounted to the housing 44 using a trigger shaft 98. Trigger shaft 98 extends between side walls 46 and 48 of housing 44 and is disposed above the entry throat 62 of the entry control device 22. C-washers 100 are used to mount trigger levers 74 and 76 to the trigger shaft 98.

Located rearwardly of trigger levers 74 and 76 are locking levers 104 and 106. Locking lever 104 includes a locking pin 108, which is received by slotted aperture 78 of the trigger lever 74. Similarly, locking lever 106 includes a locking pin 110 for engagement with the slotted aperture (not shown) of the trigger lever 76. Locking levers 104 and 106 are pivotally mounted to housing 44 using a locking lever mounting shaft 112, which is affixed to the locking levers 104 and 106 using C-washers 114. Mounting shaft 112 extends between side walls 46 and 48 of the housing 44.

Entry control device 22 further includes a bolt 115 mounted in apertures 116 and 117 contained within side walls 46 and 48 of housing 44. A solenoid 118 having a plunger 119 is interconnected to end 120 of bolt 115. Solenoid 118 when actuated imparts rotational motion to bolt 115 to permit entry control device 22 to dispense coded credit card 20 (FIG. 1) as will subsequently be described to the user of the currency dispenser system. End 120 of bolt 115 is mounted to a bolt actuating arm 121. Bolt actuating arm 121 is pivotally mounted to a solenoid link 122 having a U-shaped upper end for receiving bolt actuating arm 121. A mounting pin 123 is used to pivotally attach bolt actuating arm 121 to solenoid link 122. The lower end of solenoid link 122 is mounted to solenoid plunger 119 using a mounting pin 124. Attached to bolt 115 is a U-shaped bracket 126, having arm members 128 and 130. Bracket 126 includes slotted apertures 132 and 134 for receiving screws 136 and washers 138 for mounting bracket 126 to bolt 115. Arm members 128 and 130 include slotted apertures 140 and 142 extending longitudinally along arm members 128 and 130.

Bracket 126 is interconnected to locking levers 104 and 106 using arm members 150 and 152. One end of arm member 150 is mounted for slidable movement within slotted aperture 140 of arm member 128 of bracket 126 using a pin 154. The other end of arm member 150 is mounted to locking lever 104 using a pin 156. Similarly, arm member 152 is mounted for slidable movement within slotted aperture 142 of arm member 130 of bracket 126 using a pin 160 and washer 162. The other end of arm member 152 is pivotally mounted to locking lever 106 using a pin 164.

Figure 3:
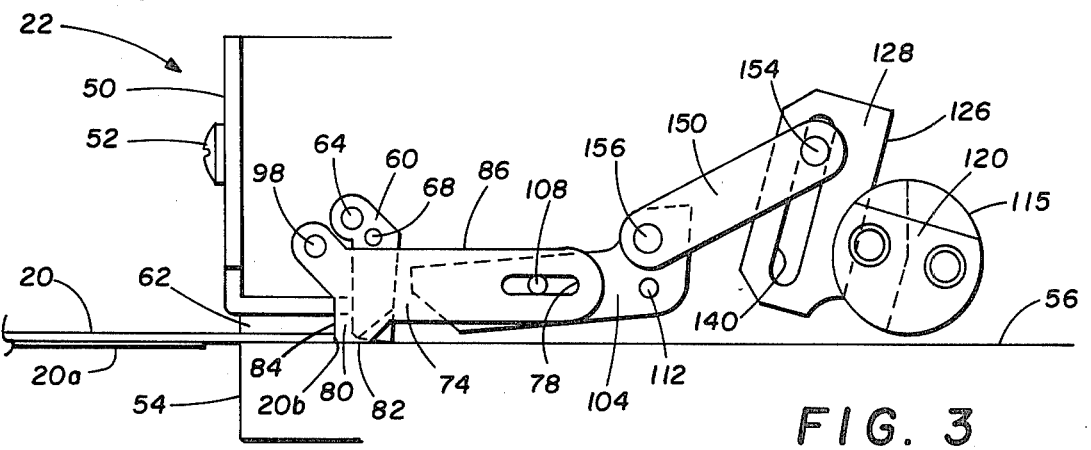
FIG. 3 is a side elevational view of the entry control device shown in FIG. 2, illustrating the closed position.

Referring simultaneously to FIGS. 3-6, wherein like numerals are utilized for like and corresponding elements throughout, the operation of the present entry control device will be described. Solenoid 118, bolt actuating arm 121 and solenoid link 122 have not been shown in FIGS. 3-6 for clarity of illustration. Although the operation of the entry control device 22 will be described with respect to the components positioned along side wall 46, as shown in FIGS. 3-6, it will be understood that the components mounted along side wall 48 are operating in an identical fashion as described herein. FIG. 3 illustrates the present entry control device 22 in the locked position. In the locked position, trigger lever 74 is positioned substantially horizontal to the upper base surface 56 of base portion 54. Bottom surface 82 of foot 80 of trigger lever 74 contacts upper base surface 56. Entry gate 60 in the closed position is substantially perpendicularly disposed to trigger lever 74. Gate pin 68 is positioned above the top camming surface 86 of trigger lever 74. Locking pin 108 of locking lever 104 is positioned centrally within the slotted aperture 78 of trigger lever 74. Furthermore, in the closed position, the arm member 150 is positioned at the upper end of arm member 128 within slotted aperture 140 of arm member 128 of the bracket 126. Arm member 128 is in a substantially vertical position with respect to the upper base surface 56 of base portion 54.

Figure 4:
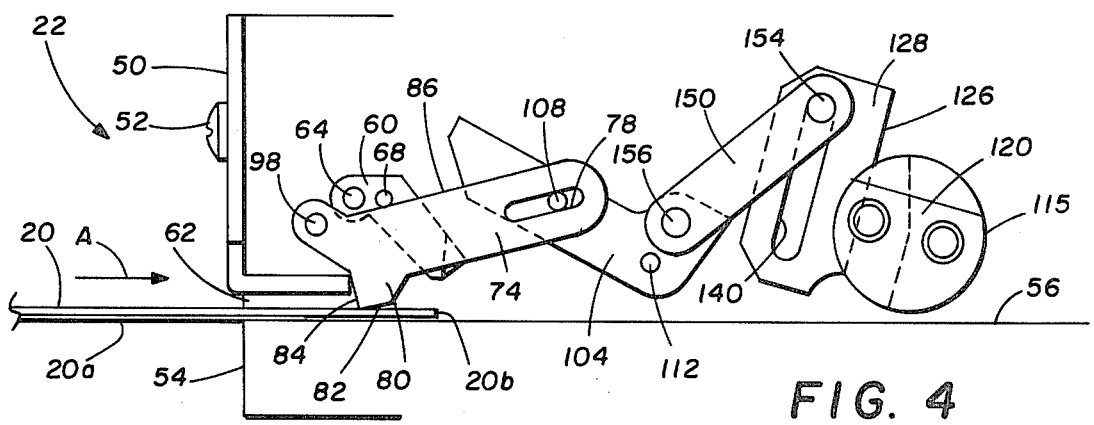
FIG. 4 is a side elevational view of the entry control device shown in FIG. 2, illustrating the open position to allow entry of a coded credit card.

FIG. 4 illustrates the position of entry gate 60 in the open position to allow entry of coded credit card 20 into the entry control device 22 in the direction indicated by arrow A. Trigger level 74 has moved from a first position shown in FIG. 3 to a second position shown in FIG. 4. Locking lever 104 has moved from the locked position shown in FIG. 3 to the unlocked position shown in FIG. 4. Coded credit card 20 including embossed information 20a such as the user's name and address, is positioned within card throat 62 to be received and oriented between the side walls 46 and 48 of housing 44. Leading edge 20b of coded credit card 20 initially engages front camming surface 84 of foot 80 of trigger lever 74 as the card 20 moves through card throat 62. The force applied to trigger lever 74 and the simultaneously applied force to trigger lever 76 by the leading edge 20b of credit card 20 causes rotation of trigger levers 74 and 76 in a counterclockwise direction about trigger shaft 98. Bottom surface 82 of foot 80 of trigger lever 74 is raised from the closed position to engage the top surface of credit card 20.

As trigger lever 74 rotates, it causes an upwardly directed force to be exerted upon locking pin 108 to thereby cause locking lever 104 to rotate in a clockwise direction about shaft 112 as illustrated in FIG. 4. Rotation of locking lever 104 to the unlocked position (FIG. 4) causes trigger lever 74 to move vertically upwardly as locking pin 108 moves towards the rear of slotted aperture 78 of trigger lever 74. The pivotal rotation of trigger lever 74 about trigger shaft 98 causes top camming surface 86 of trigger lever 74 to engage gate pin 68 of the entry gate 60. This engagement causes pivotal rotation of entry gate 60 about shaft 64 to thereby cause gate 60 to move from the closed position (FIG. 3) to the open position (FIG. 4) to allow entry of coded credit card 20 through the card throat 62 into the dispensing system.

Figure 5:
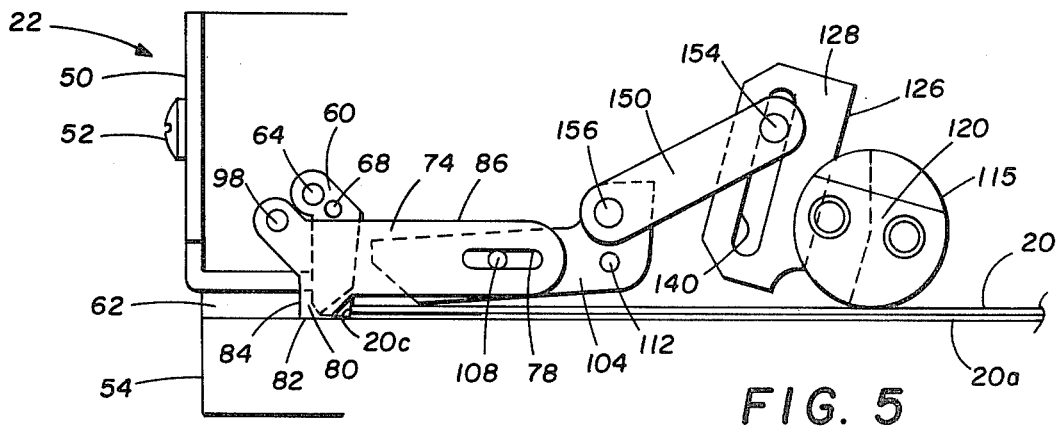
FIG. 5 is a side elevational view of the entry control device shown in FIG. 2, illustrating the closed position, after a coded credit card has entered the dispensing system.

FIG. 5 illustrates the closed position of the entry control device 22 after coded credit card 20 has passed through the open entry gate 60. After the trailing edge 20c of coded credit card 20 has passed under bottom surface 82 of foot 80 of trigger lever 74, trigger lever 74 pivotally rotates about shaft 98 to the position illustrated in FIG. 3, such that bottom surface 82 of foot 80 again contacts the upper base surface 56 of base portion 54. Similarly, locking lever 104 returns to a position substantially horizontal to the upper base surfce 56 to thereby cause disengagement of gate pin 68 from top camming surface 86 of trigger lever 74. This disengagement results in entry gate 60 pivotally rotating in a clockwise direction about shaft 64 to the closed position as shown in FIG. 3.

It should be understood that the movement of trigger lever 76 and locking lever 106 corresponds to the movement of trigger lever 74 and locking lever 104 as described herein. Therefore, it should be apparent that in order to rotate entry gate 60 from the closed position, illustrated in FIG. 3 to the open position illustrated in FIG. 4, trigger levers 74 and 76 must be simultaneously engaged by the leading edge 20b of coded credit card 20 in order to unlock locking levers 104 and 106 to actuate the entry control device 22. Engagement of leading edge 20b of coded credit card 20 with any portion of entry gate 60 will not cause entry gate 60 to rotate to the open position. Furthermore, any miscellaneous debris inserted into the entry control device 22 through the front panel 12 of console unit 10 (FIG. 1) to contact entry gate 60 or one of triggering levers 74 and 76 will not cause entry gate 60 to rotate from the closed position (FIG. 3) to the open position (FIG. 4), thereby barring entry of miscellaneous debris into the currency dispensing system. Entry of coded credit card 20 into the entry control device 22 can take place only by the simultaneous engagement of leading edge 20b with the front camming surfaces 84 and 92 of trigger levers 74 and 76.

Figure 6:
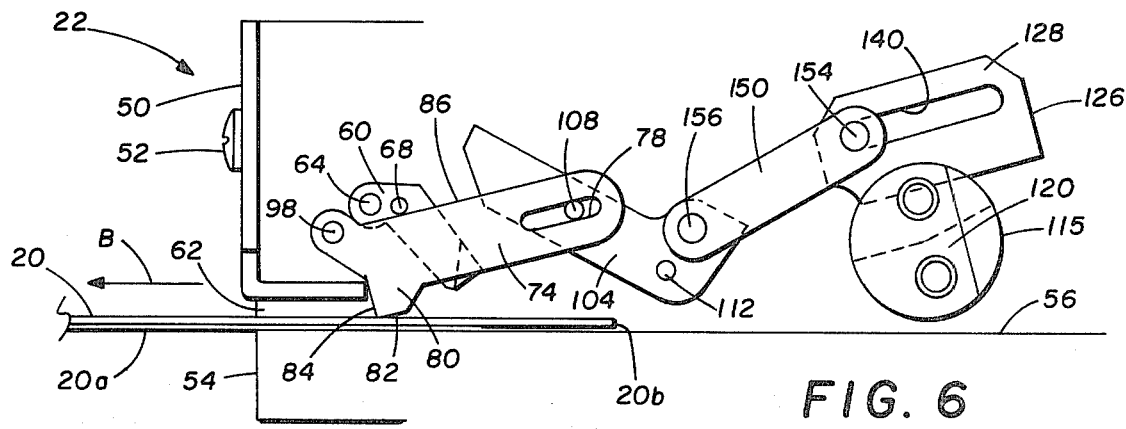
FIG. 6 is a side elevational view of the entry control device shown in FIG. 2, illustrating the open position to allow a coded credit card to be withdrawn from the dispensing system.

Referring to FIG. 6, as previously mentioned, near the completion of a dispensing transaction, the coded credit card 20 is returned to the customer through the card throat 62 in the direction indicated by arrow B. However, circumstances may arise in which a properly sized coded credit card 20 has entered the currency dispensing system, but it is desired to prevent the return of the credit card 20 to the user. These circumstances may include the expiration of the credit card, overwithdrawal of the user's account, or use of the credit card by one other than the owner, after the owner has reported the credit card lost. In these circumstances it is required that an entry control device prevent return of the credit card to the user of the currency dispensing system. The entry control device 22 of the present invention therefore, remains in the locked position as shown in FIG. 5 after entry of coded credit card 20 until actuation of solenoid 118 (FIG. 2) by the control system of the console unit 10 (FIG. 1).

If a determination has been made by the console unit 10 that the coded credit card 20 should be returned to the user, solenoid 118 (FIG. 2) is actuated to impart rotational motion through solenoid link 122 and bolt actuating arm 121 to bolt 115. Rotation of bolt 115 in turn imparts rotational motion to bracket 126 to rotate bracket 126 from the position shown in FIG. 5 to the position shown in FIG. 6 in which bracket 126 is in a position substantially horizontal to upper base surface 56 of base portion 54. This initial rotation causes the forward end of slotted aperture 140 of arm member 128 of bracket 126 to engage pin 154 of arm member 150. The continued rotation of bracket 126 causes arm member 150 to pivotally rotate locking lever 104 in a clockwise direction about shaft 112 to thereby unlock locking lever 104. In turn, the rotation of locking lever 104 causes locking pin 108 to rotate trigger lever 74 in a counterclockwise direction about shaft 98. This rotation raises trigger lever 74 such that top camming surface 86 engages gate pin 68. This engagement causes entry gate 60 to pivotally rotate in a counterclockwise direction about shaft 64 to move gate 60 from the closed position illustrated in FIG. 5 to the open position illustrated in FIG. 6. Once gate 60 has been moved to the open position, coded credit card 20 can then be dispensed through the throat 62 for return to the user. Upon deenergization of solenoid 118, the trigger lever 74, locking lever 104 and entry gate 60 return to the positions as illustrated in FIG. 3. Again, it should be understood that trigger lever 76 and locking lever 106 positioned adjacent side wall 48 (FIG. 2) are moving in response to the actuation and deactuation of solenoid 118 in a similar manner as described above with respect to trigger lever 74 and locking lever 104.

Figure 7:
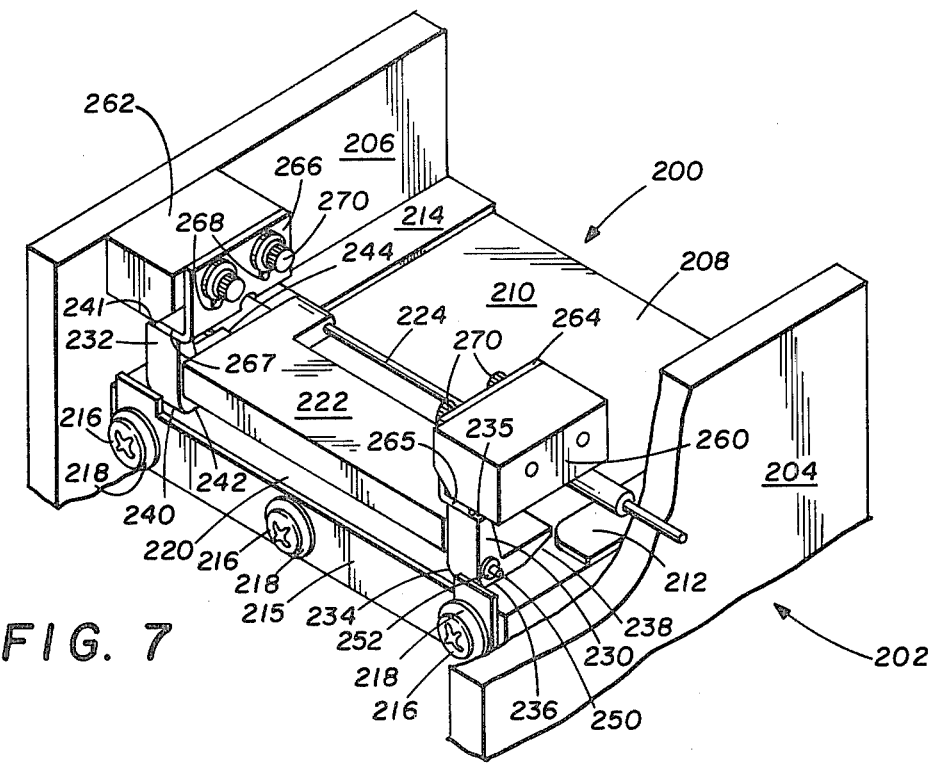
FIG. 7 is a perspective view of a second embodiment of the entry control device of the present invention.

Referring to FIG. 7, a second embodiment of the present entry control device is illustrated, and is identified generally by the numeral 200. Entry control device 200 includes a housing generally identified by the numeral 202. Housing 202 includes vertical side walls 204 and 206 and a horizontal base 208. Base 208 includes an upper surface 210 on which card guide members 212 and 214 are mounted to guide a coded credit card after entry into the entry control device 200. An entry guide 215 is mounted to the front of base 208 using screws 216 and washers 218. Entry guide 215 forms a card throat 220 through which a coded credit card can be inserted into the entry control device 200.

An entry gate 222 is disposed adjacent the throat 220 and functions to bar entry of debris and improperly sized coded credit cards into the entry control device 200. Entry gate 222 is pivotally mounted to the side walls 204 and 206 of housing 202 using a mounting shaft 224. As will subsequently be described, entry gate 222 moves from a closed position to bar entry of a coded credit card and miscellaneous debris from entering the entry control device 200 to an open position to allow entry of a coded credit card having a predetermined thickness.

Mounted adjacent to the entry gate 222 and extending within card throat 220 are actuating levers 230 and 232. Actuating lever 230 includes a front camming surface 234, a top surface 235, a bottom surface 236 and a rear ramp camming surface 238. Similarly, actuating lever 232 includes a front camming surface 240, a top surface 241, a bottom surface 242 and a rear ramp camming surface 244. Actuating levers 230 and 232 are pivotally mounted for movement between an open position and a closed position using a mounting shaft 250. Shaft 250 extends through entry gate 222 and is mounted thereto using C-washers 252.

Mounted to side walls 204 and 206 of housing 200 adjacent entry gate 222 and actuating levers 230 and 232 are support blocks 260 and 262. Support block 260 mounts an L-shaped thickness adjustment bracket 264 having an extension member 265. Support block 262 mounts an L-shaped thickness adjustment bracket 266 having an extension member 267. Brackets 264 and 266 can be adjusted such that the entry control device 200 will only allow entry of credit cards having a thickness below a predetermined maximum thickness. Thickness adjustment brackets 264 and 266 include slotted apertures 268 for use with screws 270 to mount brackets 264 and 266 to supporting blocks 260 and 262.

Figure 8:
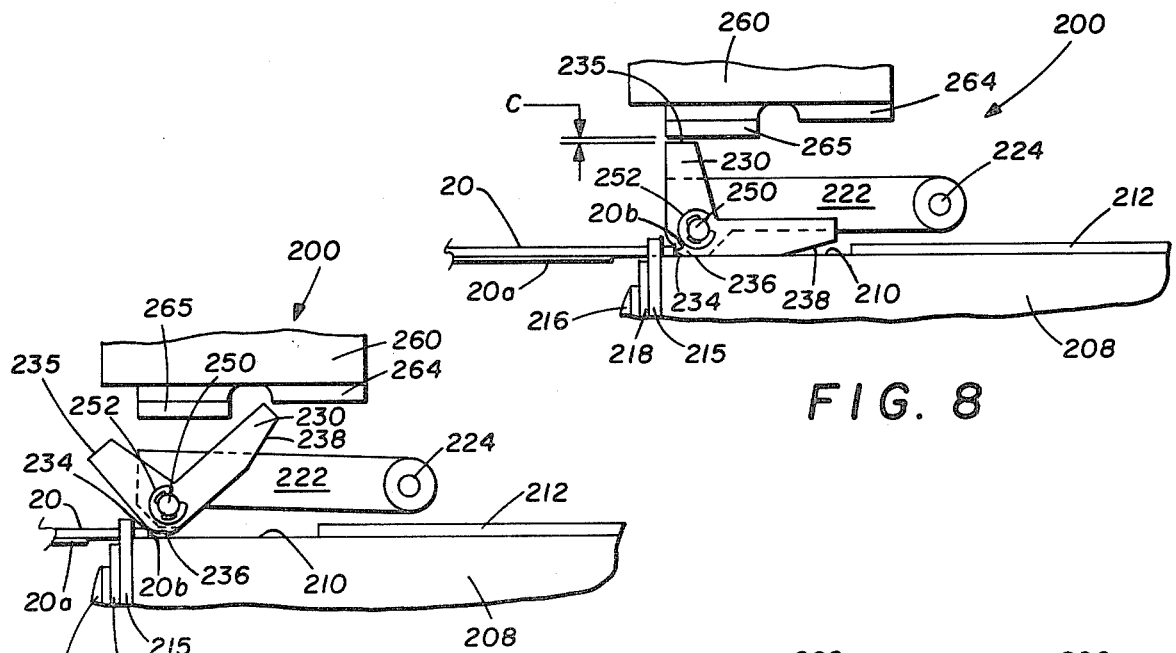
FIG. 8 is a side elevational view of the entry control device shown in FIG. 7, illustrating the closed position.
Figure 9:
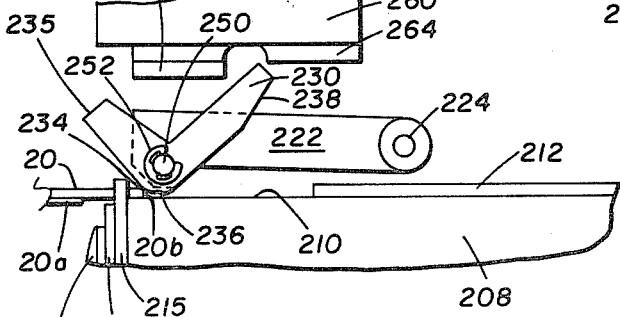
FIG. 9 is a side elevational view of the entry control device shown in FIG. 7, illustrating the engagement of a coded credit card and the control device.
Figure 10:
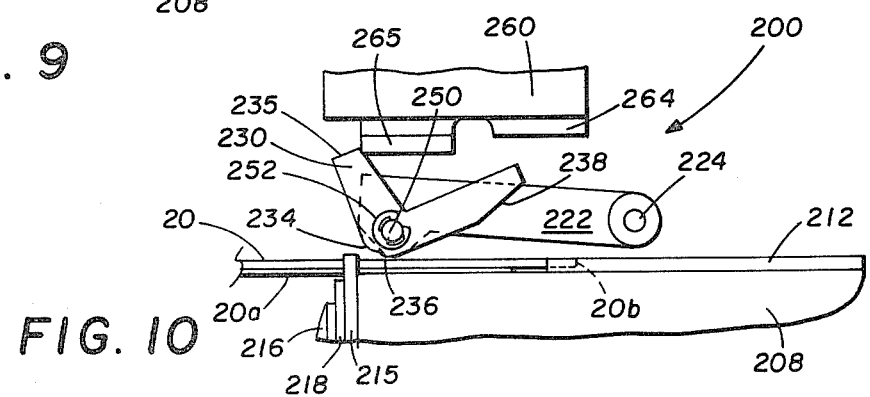
FIG. 10 is a side elevational view of the entry control device shown in FIG. 7, illustrating the open position to allow entry of a coded credit card.

Referring simultaneously to FIGS. 8, 9 and 10, the operation of entry control device 200 will now be described. Referring specifically to FIG. 8, the entry control device 200 is illustrated in the closed position in which entry gate 222 is positioned to bar entry of a coded credit card 20 having embossed information 20a. In the closed position, bottom surface 236 of actuating lever 230 contacts upper surface 210 of base 208. Upon entry of credit card 20 into throat 220, entry guide 215 receives and orients coded credit card 20 such that leading edge 20b engages front camming surface 234 of actuating lever 230. It will be understood that leading edge 20b of coded credit card 20 will simultaneously engage front camming surface 240 of actuating lever 232 when a properly sized redit card 20 is positioned within throat 220.

FIG. 9 illustrates the position of actuating lever 230 and entry gate 222 upon engagement of the leading edge 20b of coded circuit card 20 with the front camming surface 234 of actuating lever 230. It can be seen that the bottom surface 236 of actuating lever 230 has been vertically displaced upwardly as actuating lever 230 pivotally rotates counterclockwise about mounting shaft 250. This rotation in turn causes the front portion of gate 222 to rotate upwardly in a clockwise direction about supporting shaft 224 to allow entry of the credit card 20 through throat 220.

FIG. 10 illustrates the position of actuating lever 230 and entry gate 222 as credit card 20 passes under bottom surface 236 of actuating lever 230. Actuating lever 230 begins to rotate in a clockwise direction about mounting shaft 250 as coded credit card 20 continues its motion into the housing 202 of entry control device 200. After the trailing edge (not shown) of coded credit card 20 has passed from beneath bottom surface 236 of actuating lever 230, actuating lever 230 and entry gate 222 return to the closed position as illustrated in FIG. 8.

Referring again to FIG. 8, it can be seen that by vertically positioning brackets 264 and 266, only coded credit cards of a predetermined thickness will be permitted to enter the console unit 10 (FIG. 1) through entry control device 200. Through the vertical positioning of brackets 264 and 266, the distance indicated at C between extension member 265 of bracket 264 and top surface 234 of actuating lever 230 can be varied. As the distance C decreases, coded credit cards of increasing thicknesses will be barred entry into the console unit 10 (FIG. 1) by the entry control device 200. Coded credit cards having a thickness above a predetermined size upon engagement with front camming surface 234 will vertically raise actuating lever 230 such that top surface 235 will engage extension member 265 to prevent the normal counterclockwise rotation of actuating lever 230 as is shown in FIG. 9. Entry gate 222 will therefore be prevented from rotating about shaft 224 to thereby bar entry of a thick coded credit card. It will be understood that the above discussion with respect to actuating lever 230 equally applies to actuating lever 232, since the simultaneous engagement of a coded credit card with actuating levers 230 and 232 is required to rotate entry gate 222 from the closed position (FIG. 8) to the open position (FIG. 10). To vary the distance C requires adjustment of both brackets 264 and 266 to maintain the distance C constant between top surfaces 235 and 241 of actuating levers 230 and 232 and extension members 265 and 267 of brackets 264 and 266.

Return of coded credit card 20 from the entry control device 200 is effected when the trailing edge (not shown) of coded credit card 20 engages rear ramp camming surface 238 (FIG. 8) to pivotally rotate actuating lever 230 about mounting shaft 250 in a counterclockwise direction. This rotation causes entry gate 222 to pivotally rotate in a clockwise direction about shaft 224 to thereby move entry gate 222 from the closed position (FIG. 8) to the open position (FIG. 10). After the trailing edge (not shown) of credit card 20 has cleared the bottom surface 236 of actuating lever 230, actuating lever 230 will return to the position as shown in FIG. 8 to receive a subsequently entered coded credit card 20.

Whereas the present invention has been described with respect to specific embodiments thereof, it will be evident to those skilled in the art that numerous modifications and alterations are possible without departing from the spirit and scope of the invention as set forth in the appended claims.

What is claimed is:

1. A control device for controlling the entry of a preselected document into a dispensing system comprising:
    a housing having an entry passage therein for receiving and orienting the preselected document for transport into the dispensing system;
    a gate pivotally mounted to said housing for pivotal movement between a closed position for barring entry of a document into the dispensing system and rotatable to an open position by insertion of the document into said entry passage of said housing;
    a trigger pivotally mounted to said housing for movement between first and second positions, said trigger extending into said entry passage and disposed adjacent said gate, and
    a locking lever pivotally mounted to said housing and said trigger for movement between a locked position and an unlocked position corresponding to said trigger first and second positions, such that pushing the document with said trigger rotates said locking lever from said locked position to said unlocked position to cause said trigger to rotate from said first position to said second position, thereby causing rotation of said gate from said closed position to said open position, and such that disengagement of the document with said trigger causes rotation of said gate from said open position to said closed position.

2. The control device of claim 1 wherein said locking lever includes a lifting pin and said trigger includes an aperture for receiving said lifting pin for pivotally mating said locking lever and said trigger for movement of said trigger between said first and second positions and said locking lever between said locked and unlocked positions.

3. The control device of claim 1 wherein said gate includes a gate pin for engagement with said trigger when said trigger is rotated from said first position to said second position, to thereby rotate said gate from said closed position to said open position.

4. The control device of claim 1 and further including:
    means attached to said locking lever for preventing removal of the document from said entry passage.

5. The control device of claim 4 wherein said means attached to said locking lever comprises:
    an arm pivotally mounted to said locking lever; and
    a solenoid interconnected to said arm, such that when said solenoid is actuated said arm causes rotation of said locking lever from said locked position to said unlocked position to thereby rotate said gate from said closed position to said open position to allow removal of the document from said entry passage.

6. A control device for controlling the entry of a preselected document into a dispensing system comprising:
    a housing having an entry passage therein for receiving and orienting the preselected document for transport into the dispensing system;
    a gate pivotally mounted to said housing for pivotal movement between a closed position for barring entry of a document into the dispensing system and rotatable to an open position by insertion of the document into said entry passage of said housing;
    a trigger pivotally mounted to said housing for pivotal movement between first and second positions;

said trigger extending into said entry passage and disposed adjacent said gate and further including an aperture; and a locking lever pivotally mounted to said housing and including a lifting pin for engaging said trigger aperture for movement between a locked position and an unlocked position corresponding to said trigger first and second positions, such that pushing the document with said trigger rotates said locking lever from said locked position to said unlocked position to cause said trigger to rotate from said first position to said second position to thereby cause rotation of said gate from said closed position to said open position, and such that disengagement of the document with said trigger causes rotation of said gate from said open position to said closed position.

7. The control device of claim 6 and further including:

a mounting shaft having first and second ends received by said gate and disposed adjacent said entry passage, said ends being pivotally mounted to said housing for pivotally mounting said gate to said housing.

8. The control device of claim 6 and further including:

a mounting shaft having first and second ends received by said trigger and disposed adjacent said entry passage, said ends being pivotally mounted to said housing for pivotally mounting said trigger to said housing.

9. The control device of claim 6 and further including means attached to said locking lever for preventing removal of the document from said entry passage.

10. The control device of claim 9 wherein said means attached to said locking lever comprises:

an arm pivotally mounted to said locking lever; and a solenoid interconnected to said arm, such that when said solenoid is actuated said arm causes rotation of said locking lever from said locked position to said unlocked position to thereby rotate said gate from said closed position to said open position to allow removal of the document from said entry passage.

11. A control device for controlling the entry of a preselected document into a dispensing system comprising:

a housing having an entry passage therein for receiving and orienting the preselected document for transport into the dispensing system;

a gate pivotally mounted to said housing for pivotal movement between a closed position for barring entry of the document into the dispensing system and rotatable to an open position by insertion of the document into said entry passage of said housing;

first and second triggers pivotally mounted to said housing for movement between first and second positions;

said triggers extending into said entry passage and disposed adjacent the sides of said gate and the sides of said entry passage;

a first locking lever pivotally mounted to said housing and said first trigger for movement between a locked position and an unlocked position corresponding to said first trigger first and second positions;

a second locking lever pivotally mounted to said housing and said second trigger for movement between a locked position and an unlocked position corresponding to said second trigger first and second positions; and said triggers when simultaneously pushed by the document are caused to rotate said first and second locking levers from said locked position to said unlocked position to cause said triggers to rotate from said first position to said second position, to thereby cause rotation of said gate from said closed position to said open position, and such that disengagement of the document from said first and second triggers causes rotation of said gate from said open position to said closed position.

12. The control device of claim 11 wherein said first and second locking levers each include a lifting pin and said first and second triggers each include an aperture for receiving said lifting pin of one of said locking levers for pivotally mating said locking levers and said triggers for movement of said triggers between said first and second positions and said locking levers between said locked and unlocked positions.

13. The control device of claim 12 wherein said gate includes first and second gate pins for engagement with said first and second triggers when said triggers are rotated from said first position to said second position, to thereby rotate said gate from said closed position to said open position.

14. The control device of claim 11 and further including means attached to said locking levers for preventing removal of the document from said entry passage.

15. A control device for controlling the entry of a preselected document into a dispensing system comprising:

a housing having an entry passage therein for receiving and orienting the preselected document for transport into the dispensing system;

a gate having first and second ends pivotally mounted to said housing and adjacent said entry passage for pivotal movement between a closed position for barring entry of the document into the dispensing system and rotatable to an open position by insertion of the document into said entry passage of said housing;

said gate including first and second lifting pins mounted to said gate first and second ends;

first and second triggers, each including an aperture;

said triggers being pivotally mounted to said housing adjacent the sides of said entry passage and said gate and extending into said entry passage for pivotal movement between first and second positions;

a first locking lever including a lifting pin for engaging said first trigger aperture and being pivotally mounted to said housing for movement between a locked position and an unlocked position corresponding to said first trigger first and second positions;

a second locking lever including a lifting pin for engaging said second trigger aperture and being pivotally mounted to said housing for movement between a locked position and an unlocked position corresponding to said second trigger first and second positions;

means attached to said first and second locking levers for preventing removal of the document from said entry passage; and said triggers when simultaneously pushed by the front edge of the document are caused to rotate said first and second locking levers from said locked position to said unlocked position, to cause said triggers to rotate from said first position to said second position to engage said gate pins to thereby cause rotation of said gate from said closed position to said open position, and such that a disengagement of the document from said first and second triggers causes disengagement of said triggers from said gate pins to rotate said gate from said open position to said closed position.

16. The control device of claim 15 wherein said means attached to said first and second locking levers comprises:
   a first arm pivotally mounted to said first locking lever;
   a second arm pivotally mounted to said second locking lever; and
   a solenoid interconnected to said first and second arms such that when said solenoid is actuated said arms cause rotation of said first and second locking levers from said locked position to said unlocked position, to thereby rotate said gate from said closed position to said open position to allow removal of the document from said entry passage.

17. The control device of claim 16 and further including a mounting shaft having first and second ends, received by said gate and disposed adjacent said entry passage, said ends being pivotally mounted to said housing for pivotally mounting said gate to said housing.

18. The control device of claim 16 and further including a mounting shaft received by said first and second triggers and disposed adjacent said entry passage, said ends being pivotally mounted to said housing for pivotally mounting said first and second triggers to said housing.

19. A control device for controlling the entry of a preselected document into a dispensing system comprising:
   a housing having an entry passage therein for receiving and orienting the preselected document for transport into the dispensing system;
   a gate pivotally mounted to said housing for pivotal movement between a closed position for barring entry of a document into the dispensing system and rotatable to an open position when a document is inserted into said entry passage of said housing; and
   a rigid actuating lever pivotally mounted directly to said gate and disposed adjacent said entry passage for pivotal movement between first and second positions when pushed by direct contact with the document to thereby rotate said gate to said open position.

20. The control device of claim 19 wherein said gate includes:
   a first shaft for mounting said gate to said housing; and
   a second shaft for mounting said actuating lever to said gate.

21. The control device of claim 20 and further including means mounted to said housing adjacent said actuating lever for preventing the entry of documents having a thickness greater than a predetermined thickness.

22. A control device for controlling the entry of a preselected document into a dispensing system comprising:
   a housing having an entry passage therein for receiving and orienting the preselected document for transport into the dispensing system;
   a gate having first and second ends, pivotally mounted to said housing for pivotal movement between a closed position barring entry of the document into the dispensing system and rotatable to an open position when the document is inserted into said entry passage; and
   first and second actuating levers pivotally mounted to said first and second ends of said gate and disposed adjacent said entry passage for pivotal movement between first and second positions when simultaneously pushed by the document to thereby rotate said gate to said open position.

23. The control device of claim 22 wherein said gate includes:
   a first shaft for mounting said gate to said housing; and
   a second shaft for mounting said first and second actuating levers to said gates.

24. The control device of claim 23 and further including:
   means mounted to said housing adjacent said first and second actuating levers for engaging said first and second actuating levers to prevent rotation thereof, thereby permitting rotation of said gate and entry of the document into said housing when the document has a thickness above a predetermined document thickness.

* * * * *